US 11,305,136 B2

(12) United States Patent
Piatt

(10) Patent No.: US 11,305,136 B2
(45) Date of Patent: Apr. 19, 2022

(54) RESPIRATORY FACE MASK FOR IMPROVED COMMUNICATIONS

(71) Applicant: ZVerse, Inc., West Columbia, SC (US)

(72) Inventor: Michael J. Piatt, Springboro, OH (US)

(73) Assignee: ZVerse, Inc., West Columbia, SC (US)

(*) Notice: Subject to any disclaimer, the term of this patent is extended or adjusted under 35 U.S.C. 154(b) by 0 days.

(21) Appl. No.: 17/478,367

(22) Filed: Sep. 17, 2021

(65) Prior Publication Data

US 2022/0080232 A1 Mar. 17, 2022

Related U.S. Application Data

(60) Provisional application No. 63/118,720, filed on Nov. 26, 2020, provisional application No. 63/080,783, (Continued)

(51) Int. Cl.
| | |
|---|---|
| *B01D 46/00* | (2022.01) |
| *B01D 46/42* | (2006.01) |
| *B01D 46/44* | (2006.01) |
| *A62B 18/00* | (2006.01) |
| *A62B 23/02* | (2006.01) |
| *A62B 18/08* | (2006.01) |
| *A41D 13/11* | (2006.01) |
| *B01D 46/52* | (2006.01) |

(52) U.S. Cl.
CPC .......... *A62B 23/02* (2013.01); *A41D 13/1107* (2013.01); *A62B 18/006* (2013.01); *A62B 18/084* (2013.01); *B01D 46/0028* (2013.01); *B01D 46/0041* (2013.01); *B01D 46/4245* (2013.01); *B01D 46/44* (2013.01); *B01D 46/521* (2013.01); *B01D 2279/65* (2013.01)

(58) Field of Classification Search
CPC ............ B01D 46/0028; B01D 46/0041; B01D 46/44; B01D 46/4245; B01D 2279/65; A41D 13/1107; A62B 18/006; A62B 18/084; A62B 23/02
USPC .......... 55/385.1, DIG. 33, DIG. 34, DIG. 35; 96/416; 128/202.22, 205.29
See application file for complete search history.

(56) References Cited

U.S. PATENT DOCUMENTS

| | | | |
|---|---|---|---|
| 11,123,581 B1* | 9/2021 | Salvino | A41D 13/1138 |
| 2015/0114389 A1* | 4/2015 | Sernfalt | A62B 9/003 |
| | | | 128/202.22 |

(Continued)

*Primary Examiner* — Minh Chau T Pham
(74) *Attorney, Agent, or Firm* — Tracy Jong Law Firm; Cheng Ning Jong; Louis Reale

(57) ABSTRACT

The present disclosure delineates both active as well as passive respiratory filtration systems. The respiratory filtration systems are configured to be worn by a user, providing the user protection from the ambient environment, possibly containing microorganisms, pathogens, particulate matter, and the like. The respiratory filtration system is also designed to protect others by filtering the exhalation air released into the environment by the user. The disclosed respiratory filtration system(s) includes one or more hygienic materials. The hygienic materials are carefully selected and disposed at predetermined locations within the respiratory filtration system, so to optimize user to the observer(s) communications, especially the oronasal cover. Optimized communications include the transmission of distortion-free speech and/or unobstructed view of the user's oronasal area, especially the mouth.

11 Claims, 12 Drawing Sheets

Related U.S. Application Data filed on Sep. 20, 2020, provisional application No. 63/080,017, filed on Sep. 17, 2020.

(56) References Cited

U.S. PATENT DOCUMENTS

| | | | |
|---|---|---|---|
| 2015/0306536 A1* | 10/2015 | Billingsley | B01J 20/06 128/205.29 |
| 2020/0406069 A1* | 12/2020 | Fu | A62B 18/084 |
| 2021/0290988 A1* | 9/2021 | Salvino | A62B 7/10 |

* cited by examiner

RESPIRATORY FACE MASK FOR IMPROVED COMMUNICATIONS

PRIORITY CLAIM AND RELATED APPLICATIONS

This application claims the benefit of priority from the following applications: provisional application U.S. Ser. No. 63/080,017 filed on Sep. 17, 2020; provisional application U.S. Ser. No. 63/080,783 filed on Sep. 20, 2020; and provisional application U.S. Ser. No. 63/118,770 filed on Nov. 26, 2020. Each of said provisional applications is incorporated by reference in its entirety.

FIELD OF THE INVENTION

The present invention relates to active as well as passive respiratory protective face mask systems. More specifically, the present invention is directed to face mask systems configured such that the filtration media is disposed over one or more user impassive facial feature, so to not obstruct expressive facial features. The expressive facial features of primary concern are the user's oronasal areas, especially the mouth area, which in certain embodiments are visible via a transparent oronasal cover. Other embodiments are directed to protective face mask systems having nontransparent oronasal covers where distinct, understandable speech communications are emphasized.

BACKGROUND OF THE INVENTION

Face masks are universally used in the medical profession and elsewhere to reduce the risk of transferring microorganisms, such as infectious bacteria, viruses, between individuals, such as health care provider and a patient, a teacher and their students; or in any context where nose, mouth and eye protection may be indicated. Face masks having a transparent portion over the nose and mouth areas of the wearer promote better communication between the wearer and patient, reduce patient anxiety and improve the compliance of caregivers wearing the masks. Nonetheless, there exists a need for face masks that provide a more effective barrier to air-borne contaminants such as bacteria and viruses while still providing for improved communication between health care personnel and the patient.

Furthermore, in covering the mouth a certain amount of communication is lost. Even though the mask is permeable to air, the covering does degrade some of the clarity with respect to the wearer's speech making it more difficult to understand the person mask user. The situation is exacerbated if the user wearing the mask is soft spoken, does not normally speak distinctly, and the like. Still another disadvantage of the opaque mask is that when the mouth of the speaker cannot be seen it is much easier to be misunderstood. The prior art opaque mask also hides a reassuring smile and lip movements which would assist in understanding the mask wearer.

Over the years the respiratory face mask technology has evolved, and standards have been established to quantify their performance and assure product consistency. For example, passive respiratory face masks designed to meet or exceed the OSHA N95 standard. Such face masks are commonly used by medical professionals, industrial workers, and the like. These passive masks, when properly fitted and worn, are designed to filter both the user's inhalation and exhalation air. These types of face mask designs typically obscure the user's oronasal area, since they are not transparent.

Typically, N95 capable face masks are constructed from nonwoven filtration media designed to filter at least 95% of the airborne particulates entering and exiting the face mask filter, given a particle size of at least 0.3 microns. For such facemasks to be effective, it is essential that a strong seal be made with the user's nose and mouth. Over time, this intense seal and the associated tight-fitting, thin attachment straps, often lead to considerable user discomfort. The areas or causes of discomfort include: heat related issues, skin irritations, labored breathing, onset of claustrophobic feelings, and the like. Eventually, the wearer of such passive face masks will predictably experience fatigue, since they must forcefully inhale against the pressure drop of the air passing through the filter media, likewise when exhaling, must force the air out through the same filter media. Filtration materials, operating at the N95 standard, make face masks difficult to breathe through, having a pressure drop of over 0.5 inches of water across a typical filtration media. Due to the restricted air flow, the breathing air in the mask's internal volume will quickly overheat and harbor excess moisture leading to additional user discomfort. In certain circumstances the aforementioned points of user discomfort are significant factors that determine whether a worker will wear suitable protective gear or not. Moreover, due to the facial feature variations, an adequate seal between the face mask and the user may not always be possible, especially in situations where the user possesses facial hair.

Another type of passive face mask system that overcomes many of aforementioned N95 capable face mask drawbacks is the simple transparent face shield. These shields will typically cover the user's nose, mouth, and eyes. The protective lens and support apparatus can be substantially free from contact with the user's face. Unfortunately, because these face shields possess open, unprotected perimeters, pathogens and/or particulate matter have several unobstructed paths to reach the user. These shields find utility in environments where the user is seeking protection from occupational airborne particulates or like contaminates. For example, shrapnel from industrial processes, e.g., grinding wheels; splatter and splash type contaminants from medical procedures; and the like.

It's apparent, that in the protective face mask arts, there's a long felt need for improved active as well as passive respiratory filtration systems that provide the user protection from the ambient environment, possibly containing microorganisms, pathogens, particulate matter, and the like. Also, of value, are systems designed that will simultaneously protect others by filtering the exhalation air released into the environment by the user. Desired are respiratory filtration systems that optimize user-observer(s) communications. Optimized communications include the transmission of clear speech and/or unobstructed view of the user's oronasal area, especially the mouth depending on the communicative circumstances between the user and the observer(s), or the like.

SUMMARY OF THE INVENTION

The present disclosure delineates both active as well as passive respiratory filtration systems. The respiratory filtration systems are configured to be worn by a user, providing the user protection from the ambient environment, possibly containing microorganisms, pathogens, particulate matter, and the like. The respiratory filtration system is also designed to protect others by filtering the exhalation air released into the environment by the user. The disclosed respiratory filtration system(s) are comprised from one or more hygienic materials. The hygienic materials are carefully selected and disposed at predetermined locations within the respiratory filtration system, so to optimize user-observer(s) communications. Optimized communications include the transmission of distortion-free speech and/or unobstructed view of the user's oronasal area, especially the mouth.

Accordingly, it is an object of the present invention to optimized user communications to one or more observers, or the like. Communications include user's speech and/or facial gestures, enabled by use of a transparent oronasal cover or expression window, which allows a substantially unobstructed view of the user's oronasal area, especially the mouth.

It is another object of certain embodiments of present invention to provide a respiratory filtration system, which is optimized for an unobstructed view of the user's oronasal area, where the air filters are located over impassive facial features, or the like. For example, contained within right and left chamber assemblies, where the filter containing assemblies are positioned under the user's respective right and left eyes, e.g., the user's right and left cheeks.

It is yet another object of certain embodiments of present invention having an oronasal cover where at least a portion of the oronasal cover is configured from a substantially transparent material, creating an expression window, viewing portal, or the like.

It is a further object of certain embodiments of the present invention to provide an oronasal cover having a transparent front face, comprising at least one planar surface. In preferred embodiments, given an upright, vertical face mask orientation, one or more of the transparent planar surfaces is configured to possess an angle of inclination from about 150 to 170 degrees, so to minimize/eliminate reflective glare experienced by an observer(s).

It is another object of certain embodiments of the present invention to provide an oronasal cover configured from a hygienic material that is optimized for unambiguous, distortion-free transmission of speech from the user to one or more observers. Qualifying oronasal covers that are non-transparent are acceptable in specific situations, e.g., when a user(s) is speaking into a microphone or the like. In such scenarios, the observer or receiving person or device is not privy to a clear view of the user's oronasal area.

It is yet another object of certain embodiments of the present invention to provide at least one removable, modular forced air module, which provides a user additional or supplemental filtered air produced by battery operated fan(s) functionally coupled to an air filter. Some embodiments further comprise a control system for managing battery power, controlling the volume of supplemental filtered air delivered per unit time, and the like.

It is yet another object of certain embodiments of present invention to provide an oronasal cover where at least the portion of the cover, which resides over the user's mouth, is positioned at least about 1 inch away from the user's mouth, so that reflective speech distortions are minimized.

It is a further object of certain embodiments of the present invention to provide a conforming seal disposed about the oronasal circumferential edge, located on the oronasal cover, to strengthen the sealing engagement between the face mask and the user.

It is yet another object of certain embodiments of present invention to provide input filters and/or output filters fabricated from a variety of filtration materials, including: pathogenic filtering materials, particulate contaminant filtering materials, High Efficiency Particulate Air (HEPA) certified materials, N95 capable materials, and any combination thereof. Composite filters comprising two or more layers of various filtering materials can be configured to yield enhanced air filtration results.

It is a further object of the present invention to provide an elongated air filter dispersion cavity such that the entire surface of the inner face and/or outer face of the air filter participates in the filtering process. By the elimination of filtration dead spots, the life of the lifter is lengthened, and the air flow resistance through the filter is reduced.

It is another object of this invention to provide a relatively simple system that is economical from the viewpoint of the manufacturer and consumer, is susceptible to low manufacturing costs regarding labor and materials, and which accordingly evokes low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

PARTICULAR ADVANTAGES OF THE INVENTION

The present disclosure delineates both active as well as passive respiratory filtration systems. The respiratory filtration systems are configured to be worn by a user, providing the user protection from the ambient environment, possibly containing microorganisms, pathogens, particulate matter, and the like. The respiratory filtration system is also designed to protect others by filtering the exhalation air released into the environment by the user. The disclosed respiratory filtration system(s) are comprised from one or more hygienic materials. The hygienic materials are carefully selected and disposed at predetermined locations within the respiratory filtration system, so to optimize user to the observer(s) communications. Optimized communications include the transmission of clear speech and/or unobstructed view of the user's oronasal area, especially the mouth.

BRIEF DESCRIPTION OF THE DRAWINGS

The ensuing detailed description section makes reference to the annexed drawings. An enhanced understanding of the present invention will become evident when consideration is given to the detailed description thereof and objects other than the aforementioned become apparent. The invention will be described by reference to the specification and the annexed drawings, in which like numerals refer to like elements, and wherein.

DEFINITIONS OF TERMS USED IN THIS SPECIFICATION

Figure 1:
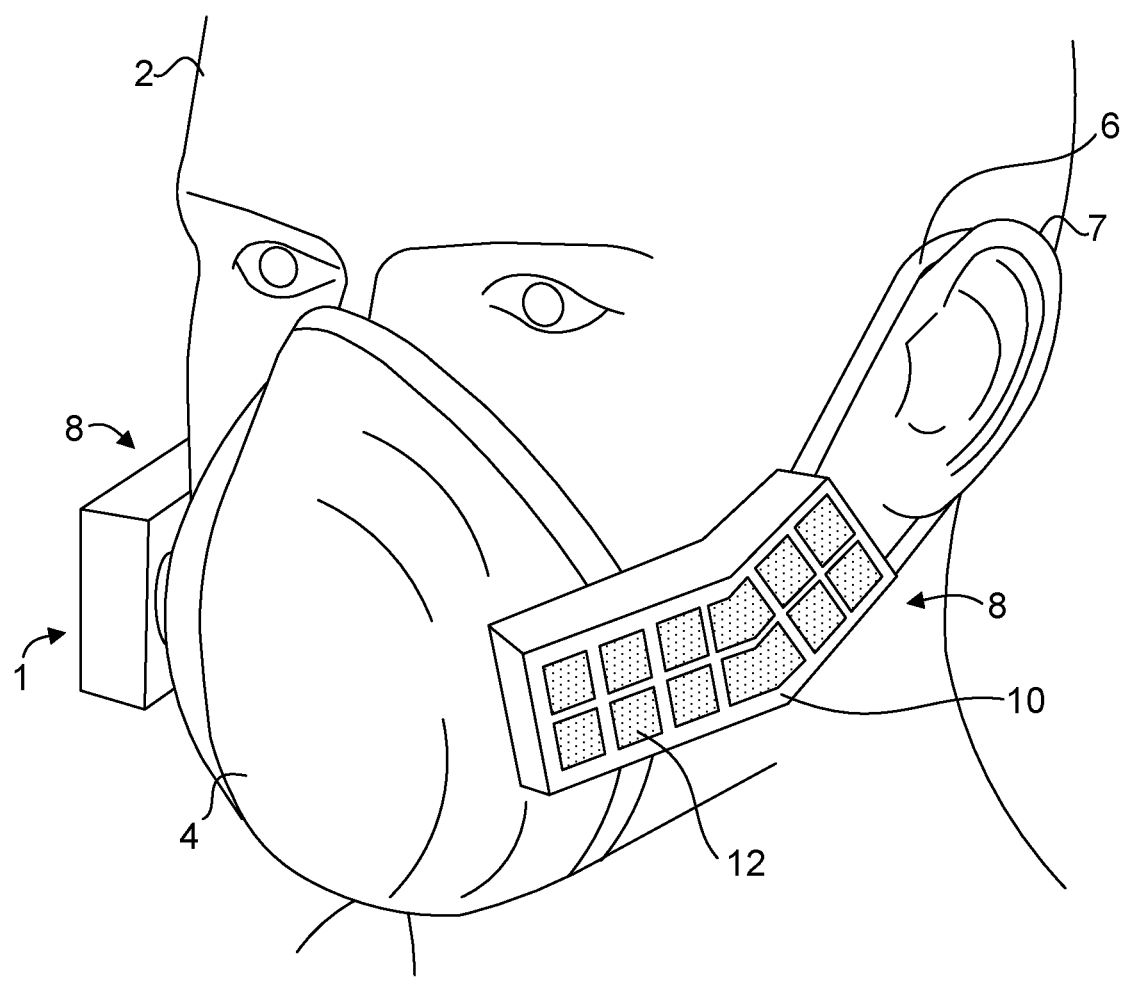
FIG. 1 illustrates a perspective view of a compact embodiment of a passive respiratory filtration system affixed to a user.

The active respiratory open face shield filtration system (AROFSS) discussed throughout this disclosure shall have equivalent nomenclature, including, but not limited to: the device, the system, the assembly, the face shield, the unit, the present invention, or the invention. Additionally, the term exemplary shall possess a single meaning throughout this disclosure; wherein the sole focus is directed to serving as an example, instance, or illustration. The terms: observers, others or bystanders shall be defined as individuals within the immediate environment of the user, having a reasonable probability of receiving an airborne microorganism or pathogen from the user. The term upper torso shall be understood to include the shoulders, neck, and any member of the head capable of providing support for the respiratory face shield systems.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Note that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "possessing" and "having" are all to be interpreted as open-ended terms, are all considered equivalent terms, and are used interchangeably.

The term hygienic material shall broadly define a material that has the capacity to block or substantially filter microorganisms or particulates. The hygienic material can be optically transparent, opaque, or any remaining nontransparent possibilities.

In this disclosure, the term oronasal shall broadly defined as pertaining to at least the mouth area of the user, unless otherwise stipulated.

PARTS/FEATURES LIST

1—passive respiratory filtration system (compact embodiment)
2—user (head portion shown)
4—oronasal cover
6—support strap(s), part of harness support system
7—ear(s)
8—right and left chamber assemblies
10—vented outer wall
12—apertures, allows air to pass in both directions
14—cheek areas (both right and left cheek areas of user)
16—nose-mouth perimeter
18—nose
20—mouth
21—passive respiratory filtration system (modular embodiment)
22—right chamber assembly
24—left chamber assembly
26—air filter
28—end-cover
30—vented outer wall
32—inner wall
34—elongated air filter dispersion cavity (EAFDC)
36—air portal
38—inner face (of filter 26)
40—outer face (of filter 26)
42—conforming seal 44—oronasal circumferential edge
46—oronasal cover
48—front face (of oronasal cover 46)
50—fastener (threaded ring which attaches to end of air portal 36)
52—mouth to oronasal cover gap
54—stop(s), for accurate filter 26 placement
56—unfiltered air (from ambient environment surrounding user)
58—filtered air
60—breathing chamber
64—pleats
66—seal (gasket for sealing perimeter of filter 26)
68—active respiratory filtration system (modular embodiment)
70—oronasal cover
72—front face (of oronasal cover 70)
74—right chamber assembly (modular embodiment)
76—left chamber assembly (modular embodiment)
78—right forced air module
80—left forced air module
82—active respiratory filtration system, affixed to a user
84—conformable engagement seal
86—expression window (observer's perspective)
87—inhalation phase
88—unfiltered air (portion drawn in from module input 94)
90—supplemental filtered air
92—module output
94—module input
96—air filters (right and left filters)
98—air pumps (fans)
99—complete breathing cycle (inhalation, exhalation)
100—exhalation air (from user)
101—exhalation phase
102—filtered air
103—active respiratory filtration system (modular embodiment)
104—outer module fan housing
105—right chamber assembly
106—fan (s)
107—left chamber assembly
108—inner module fan housing
110—control system
112—control board
114—on-off switch
116—forced air module
118—anti-glare respiratory filtration system (active or passive)
120—power source
122—receiving portion, of right chamber assembly
124—end-cover (for converting an active system to a passive system)
126—oronasal cover
128—upper window (front face of oronasal cover)
130—lower expression window (front face of oronasal cover)
132—angle of inclination
134—supplementary angle (to angle of inclination 132)
136—horizon line (level or parallel to the horizon)
138—rotatable strap plate
140—main portion, of active respiratory filtration system
142—support member, harness plate base
144—pivot point
146—support strap receptacles

DETAILED DESCRIPTION

With reference to the drawings of the present invention, several embodiments pertaining to the faucet system of the present invention thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Terminology of similar import other than the words specifically mentioned above likewise is to be considered as being used for purposes of convenience rather than in any limiting sense.

FIG. 1 illustrates a perspective view of a compact embodiment of a passive respiratory filtration system 1 type face mask. Passive respiratory filtration system 1 attaches to user 2 via support straps 6, which engage ears 7. The inner volume associated with oronasal cover 4 comprises breathing chamber 60 (best depicted in FIG. 4). Breathing chamber 60 is fluidly connected to right and left chamber assemblies 8. Each of these chamber assemblies provides a holding enclosure or predetermined location for a filter, such as filter 26. Each chamber assembly possess a vented outer wall 10 having a plurality of apertures 12, which allows air to pass in both directions, accommodating user's 2 complete breathing cycle, thereby providing user 2 protection from the ambient environment, possibly containing microorganisms, pathogens, particulate matter, and the like; as well as protecting others by filtering exhalation air released into the environment by user 2.

The passive respiratory filtration system 1 embodiment is optimized for the transmission of speech from user 2. Oronasal cover 4 configured from a hygienic material that is optimized for the unambiguous, distortion-free transmission of speech from the user to the user's proximate environment. Qualifying oronasal covers that are nontransparent are acceptable in specific situations, e.g., when a user(s) is speaking into a microphone, communicating in dim light, with the visually impaired, or the like. In such scenarios, the observer is not present or visually capable of appreciating a clear view of the user's oronasal area. In this embodiment, apertures 12 located on both right and left chamber assemblies 8, provide an additional means for transmitting user's 2 speech from breathing chamber 60 to the user's proximate environment.

Figure 2:
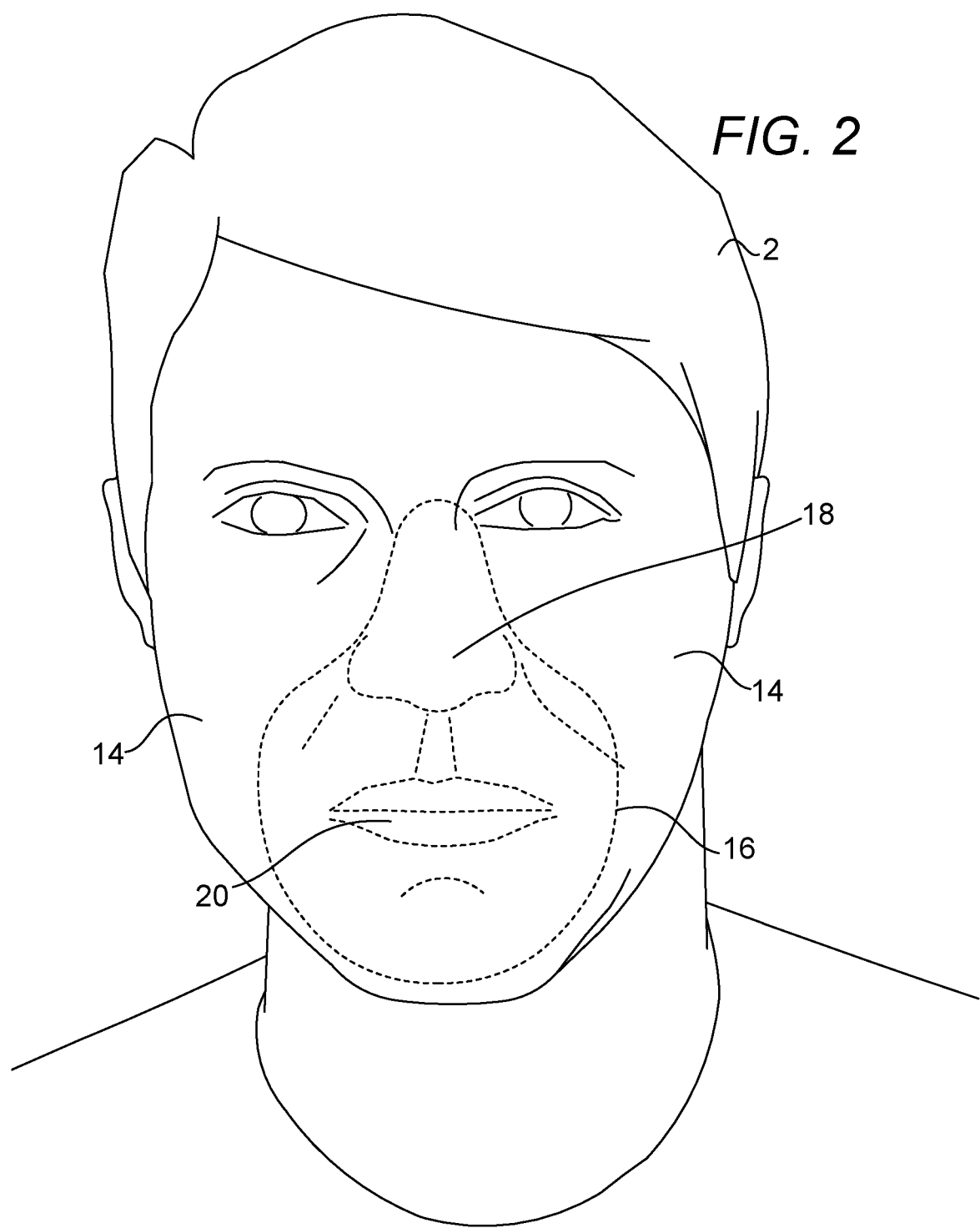
FIG. 2 illustrates a front view of a user, showing pertinent facial features. Delineated is a nose-mouth perimeter produced by the individual geometries of the user's nose and mouth and positional relationships thereof.

FIG. 2 illustrates a front view of user's 2 head, showing pertinent facial features. Delineated is a nose-mouth perimeter 16 formed by the combination of the individual geometries of nose 18 and mouth 20 and positional relationships thereof. The areas delineated as cheek areas 14 are examples of impassive facial features, and are areas for locating nontransparent components, such as filters, so to free up the oronasal area for the use of transparent oronasal covers 4, typically fabricated from transparent, nonporous, polymeric type materials, which cannot function as filtration media.

Figure 3:
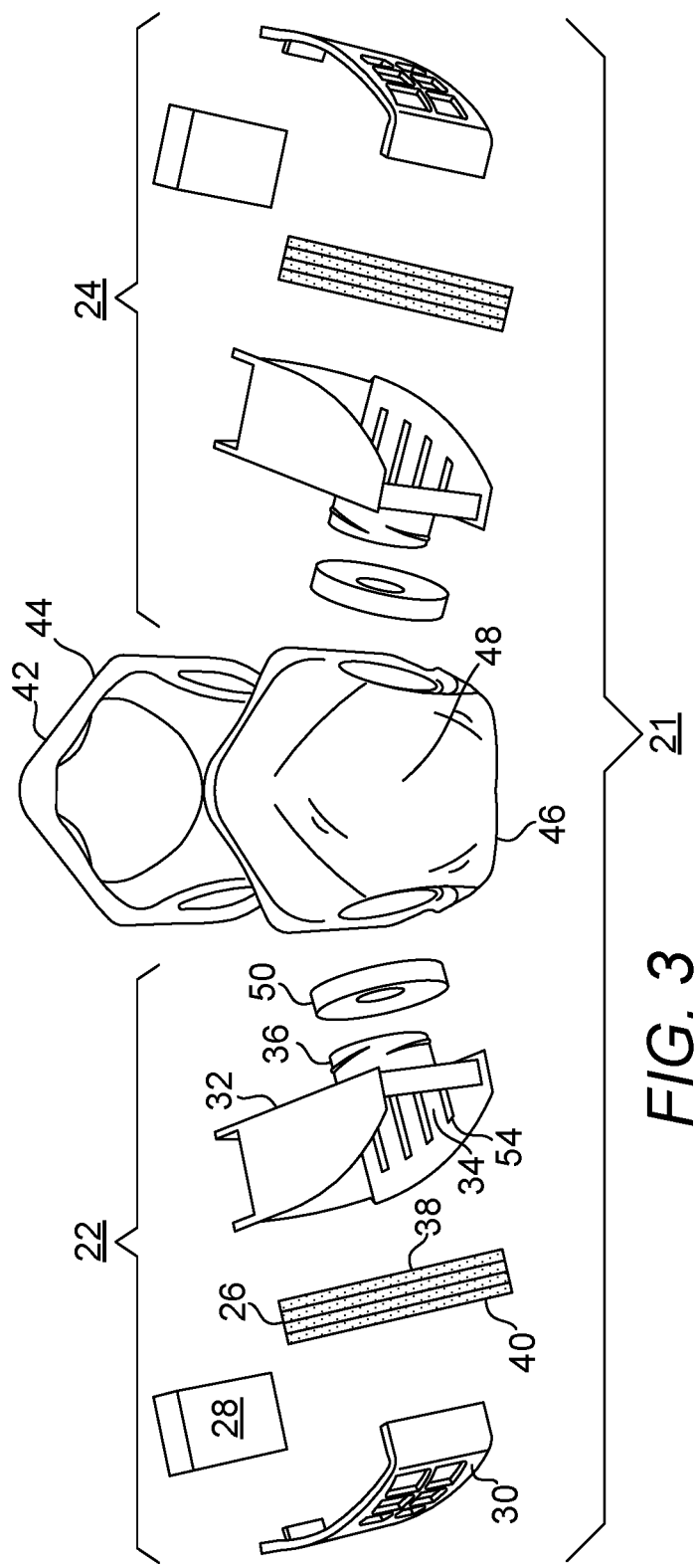
FIG. 3 depicts an exploded perspective view of the typical components comprising a passive, modular respiratory filtration system.

FIG. 3 depicts an exploded perspective view of a modular type filter system embodiment 21, and the typical components comprising such a passive respiratory filtration system of the present invention. Passive respiratory filtration system 21 is comprised of three fluidly interconnected subsystems, right chamber assembly 22, left chamber assembly 24, and centrally located oronasal cover 46, fluidly connecting the three assemblies. It is understood that typical embodiments of the present invention are substantially symmetrical about oronasal cover 46; therefore, components depicted on right chamber assembly 22 are substantially mirror images of those components associated with left chamber assembly 24. Accordingly, right chamber assembly 22 is comprised of the following main components:

Air filter 26, which can be fabricated from a variety of filtration type materials, such as a pathogenic filtering material, a particulate contaminant filtering material, a HEPA certified material or any combination thereof. Air filter 26 is comprised of two primary, opposing surfaces, inner face 38 and outer face 40.

Figure 10:
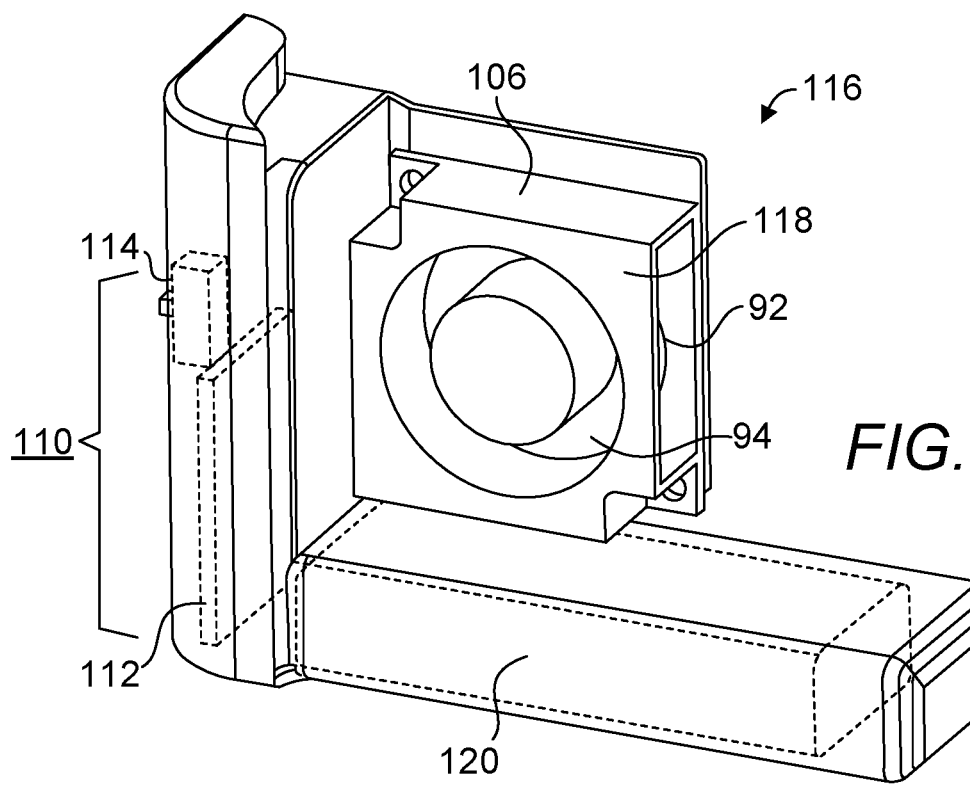
FIG. 10 illustrates a perspective view of a forced air module. Typically, an active, modular respiratory filtration system will have a forced air module configured to be received by the left side of the system and a forced air module configured to be received by the right side of the active face mask filtration system.

End-cover 28, which functions as a service door in some embodiments, in other embodiments it serves to convert an active respiratory filtration system to a passive respiratory filtration system by sealing the chamber assemblies 22, 24 openings, sans a forced air module 116 (best depicted in FIG. 10).

Vented outer wall 30, functions as a support member for chamber assemblies 22, 24; as well as providing a venting means for air movement to and from the system. Inner wall 32, provides a support surface for air portal 36, as well as providing a wall type structure to the elongated air filter dispersion cavity (EAFDC) 34 enclosure. Note that fastener 50 engages distal end portion air portal 36, and functions to fasten oronasal cover 46 to right chamber assembly 22 and left chamber assembly 24.

Elongated air filter dispersion cavity (EAFDC) 34, EAFDC 34 is a gap or void primarily bound by Inner wall 32 and inner face 38 of air filter 26, and serves to load level or balance the air interactions with filter 26, so that one portion of filter 26 does not bear a greater burden than any other portion, thereby extending filter life and filter performance. Filter 26 is held in place by a series of stops 54, such stops 54 can take on a variety of forms, including ribs, posts, and the like.

Oronasal cover 46 provides a substantially sealed breathing chamber 60 for user 2. Oronasal cover 46 can be configured from a variety of materials, depending on needs of a given situation. For example, a transparent material can be utilized on at least front face 48 when a clear view of the oronasal portion of the user is of importance; or a nontransparent filtration material optimized for speech transmission can be used when verbal communications governs the situation at hand. Oronasal cover 46 includes an oronasal circumferential edge 44 that approximately sealingly engages nose-mouth perimeter 16. Enhanced sealing engagement can be attained by the use of conforming seal 42 disposed about oronasal circumferential edge 44.

Figure 4:
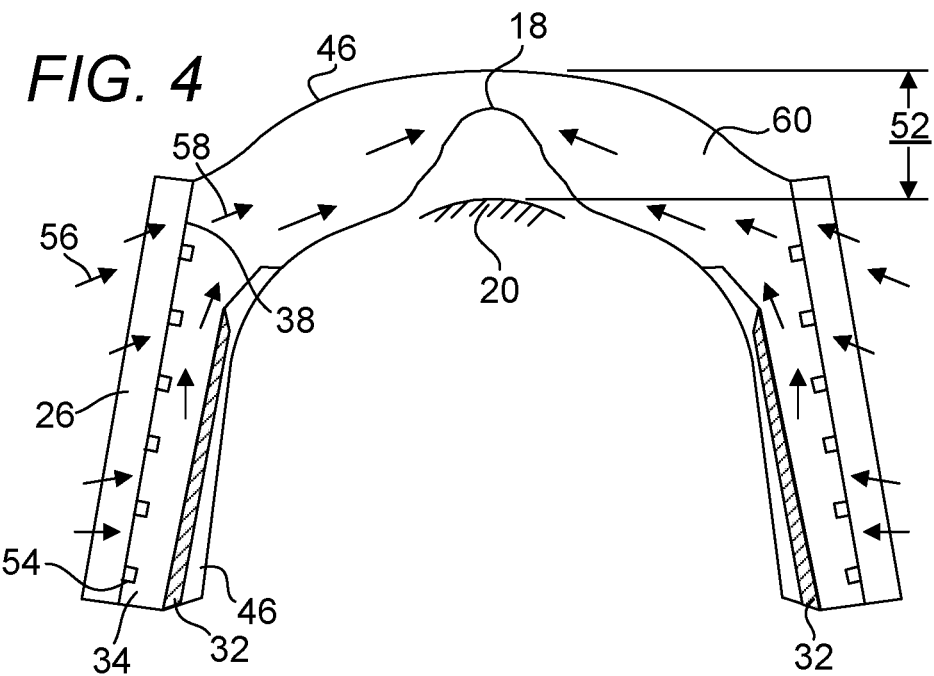
FIG. 4 illustrates a top view of an exemplary passive respiratory filtration system showing typical airflow paths for the inhalation portion of a user's breathing cycle.

FIG. 4 illustrates a top view of an exemplary passive respiratory filtration system 21 showing typical airflow paths for the inhalation phase of user's 2 breathing cycle. Depicted is filter 26 engaging stops 54, which locks filter 26 in a predetermined location. Inner face 38 of filter 26 forms one surface of elongated air filter dispersion cavity (EAFDC) 34 enclosure, whereas inner wall 32 forms the opposing surface. Breathing chamber 60 formed by oronasal cover 46, enclose both nose 18 and mouth 20 of user 2. The distance from mouth 20 and the inner surface of oronasal cover 46 is delineated as mouth to oronasal cover gap 52. Via experimentation, it has been determined that oronasal cover gap 52 distance is critical in the reduction/elimination associated with speech distortion. A working range for oronasal cover gap 52 is from about 0.5 inches to about 2.0 inches; whereas a more preferred range is from about 1.0 inches to about 2.5 inches; yet another preferred range is from about 1.5 inches to about 3.0 inches.

As user 2 inhales, unfiltered air 56 from ambient environment surrounding user is drawn through air filter 26 and enters EAFDC 34 in a substantially uniform manner about the entire length of EAFDC 34's, which prevents the air currents from preferring one portion of air filter 26 over another, ensuring filtration load leveling, resulting in the maximization of filter performance and filter life.

Figure 5:
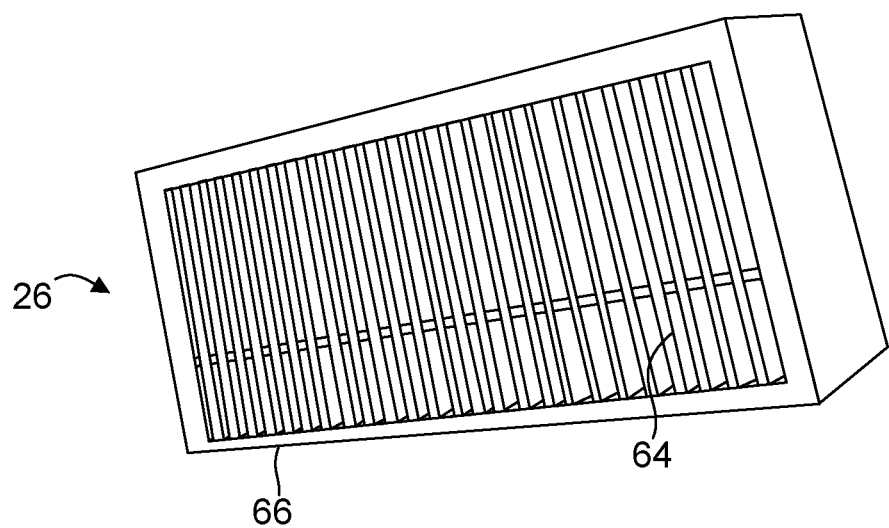
FIG. 5 illustrates a perspective view of an exemplary filter for use in the right and left chamber assemblies.

FIG. 5 illustrates a perspective view of an exemplary air filter 26 for use in the right and left chamber assemblies 22, 24. There are a multitude of air filters that can be incorporated in the present invention; filter 26 selection is dependent on the specifics of the application(s). Exemplary air filters 26 include: pathogenic filters, particulate contaminant filters, high-efficiency particulate absorbing filters or HEPA certified filters, and the like. Depicted is a HEPA-like filter, characterized by several layers of deeply formed pleats 64. The addition of seal 66 about the perimeter of filter 26 ensures that there is no air leakage between EAFDC 34 and user's 2 immediate environment.

Figure 6:
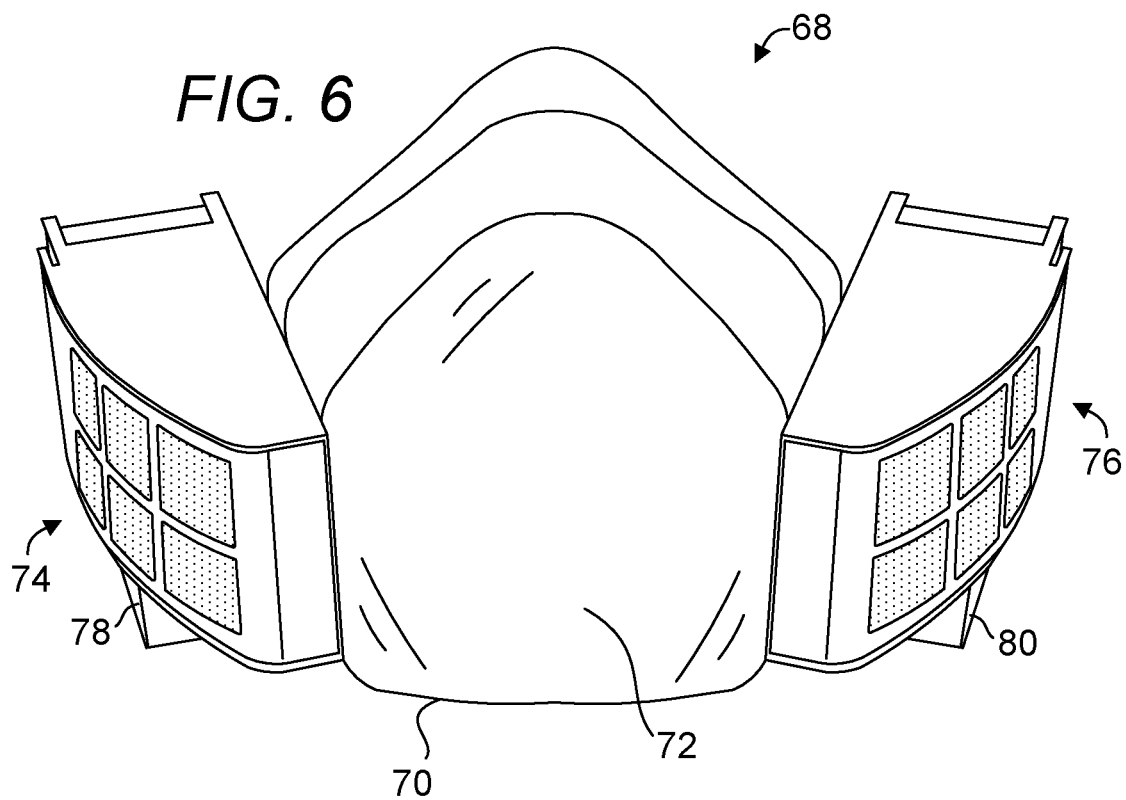
FIG. 6 illustrates a perspective view of an exemplary active respiratory filtration system, having right and left chamber assemblies comprising respective right and left forced air modules.

FIG. 6 illustrates a perspective view of an exemplary active respiratory filtration system 68. Active respiratory filtration system 68 is adapted to affix to user 2, in an exemplary manner, as shown in subsequent FIG. 7. The inner volume associated with oronasal cover 70, behind front face 72, delineates breathing chamber 60 (best depicted in FIG. 8). Breathing chamber 60 is fluidly connected to right and left chamber assemblies 74 and 76. Each chamber assembly provides a holding enclosure or predetermined location for a filter, such as exemplary filter 62. Additionally, right chamber assembly 74 possesses a removable right forced air module 78; and left chamber assembly 76 possesses a removable left forced air module 80. Except for the right forced air module 78 and left forced air module 80, exemplary active respiratory filtration system 68 is substantially similar to the aforementioned embodiments, such as delineated in FIG. 3. Because of the additional apparatus, it is reasonable to expect that the various embodiments associated with active respiratory filtration system 68 possess greater volume, weight, and cost, with respect to the passive respiratory filtration system counterpart.

Figure 7:
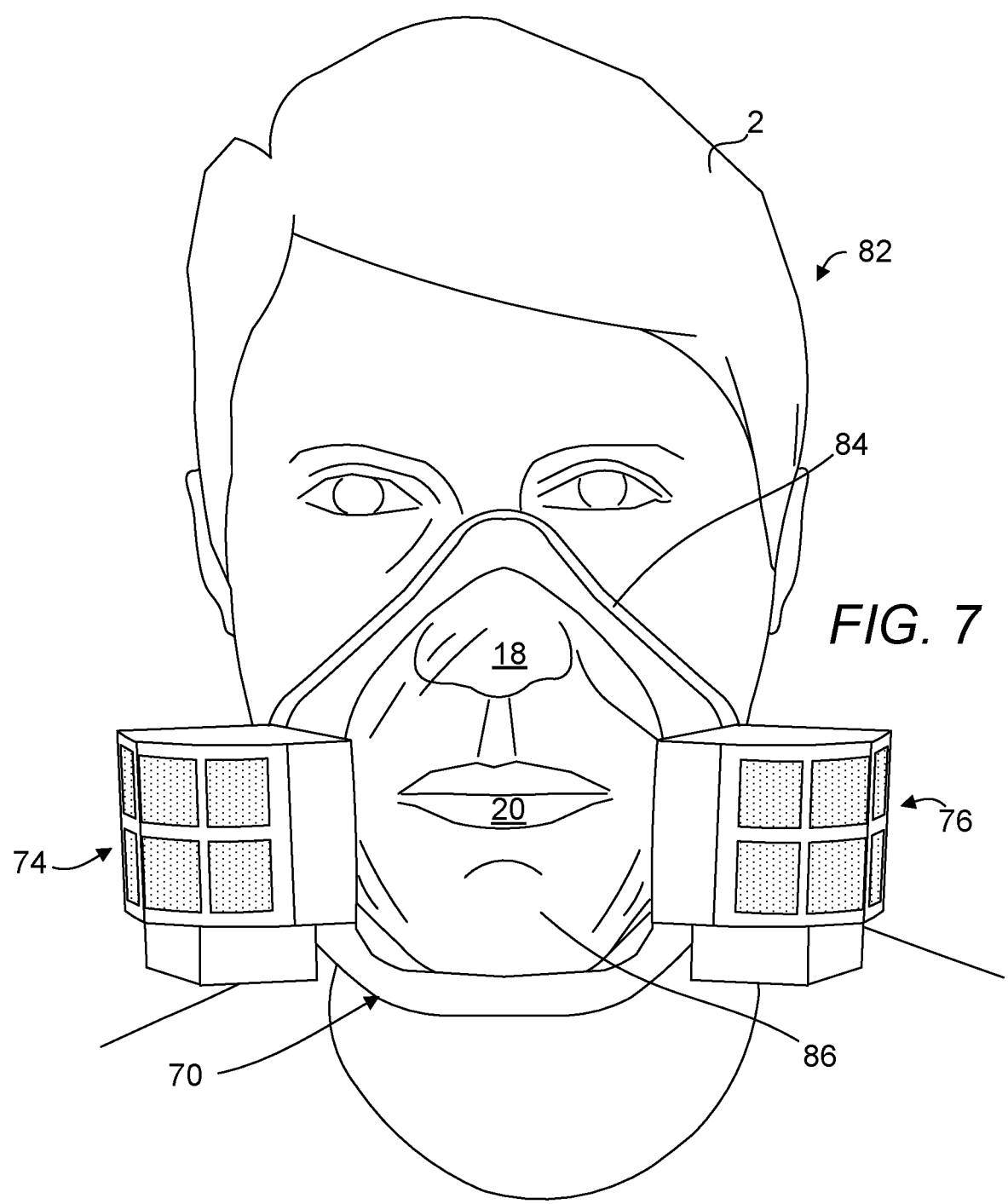
FIG. 7 illustrates a front view of a respiratory filtration system, alternate embodiment, affixed to a user.

FIG. 7 illustrates a front view of an exemplary active respiratory filtration system 82 affixed to a user 2. The embodiment explicitly depicts oronasal cover 70 having a transparent expression window 86 where user's 2 oronasal area, including nose 18 and mouth 20, are clearly visible to an observer(s). Additionally depicted is oronasal cover 70 which further includes a conformable engagement seal 84 about its circumferential edge, configured to sealingly engage with nose-mouth perimeter 16. In environments having high airborne contaminates enhanced sealing engagement between user 2 and oronasal cover 70 is recommended, and again, can be attained by the use of conformable engagement seal 84.

Figure 8:
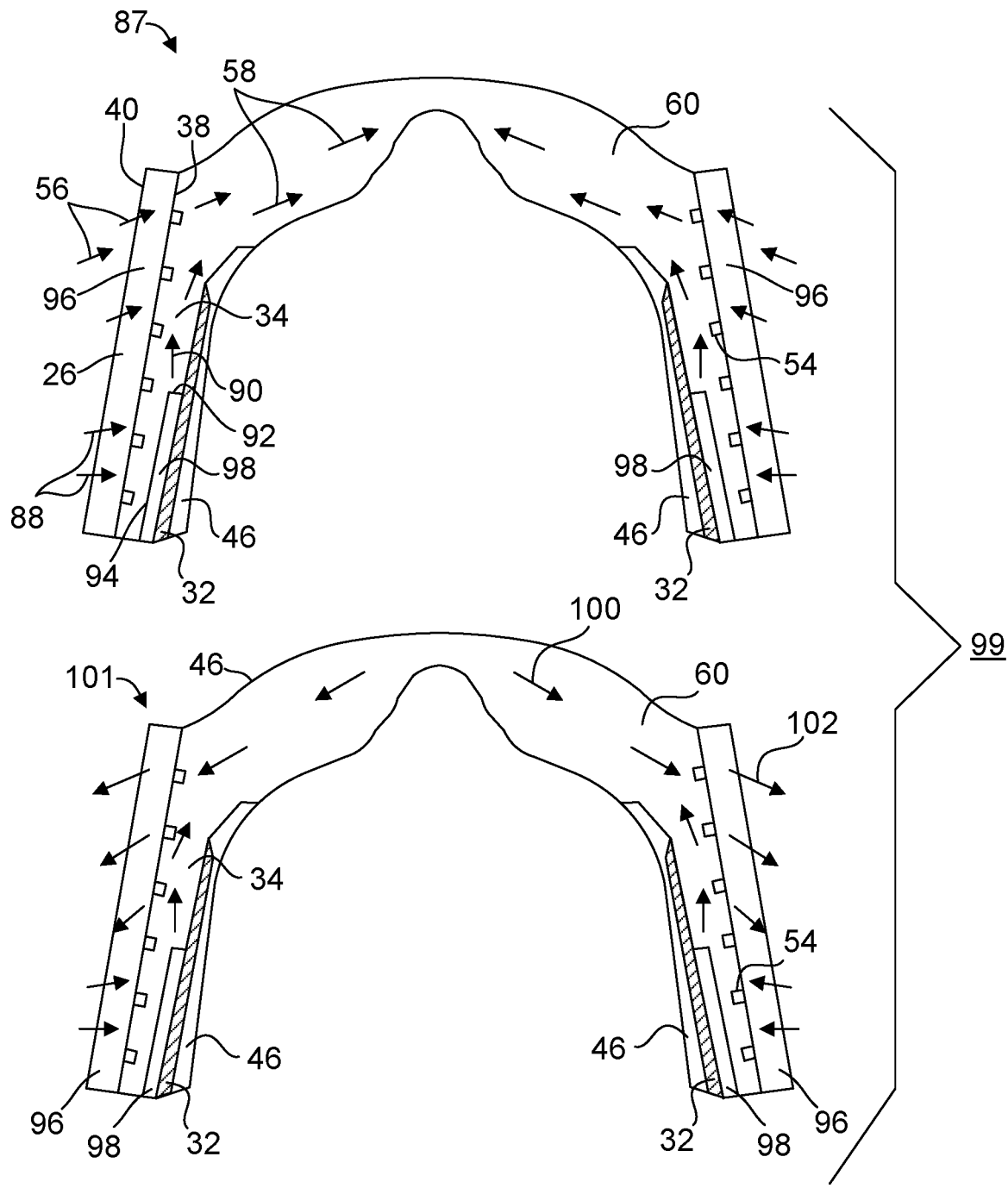
FIG. 8 illustrates top view, airflow diagrams of an exemplary active respiratory filtration system. Diagrams include airflow depictions during both phases of the user's breathing cycle, i.e., inhalation, exhalation.

FIG. 8 illustrates top view airflow movements for inhalation phase 87 and exhalation phase 101. Complete breathing cycle 99 is comprised of inhalation phase 87 and exhalation phase 101. The depictions are directed to exemplary active respiratory filtration type systems containing both a right forced air module 78 and a left forced air module in their respective chamber assemblies. The function of the right forced air module 78 and a left forced air module is to assist user 2 with the inhalation phase 87 comprising approximately half of complete breathing cycle 99; or in other words, supply supplemental filtered air 90 to user 2. By supplying supplemental filtered air 90 the inhalation effort associated with user 2 is reduced.

Illustrated in inhalation phase 87 are right and left filters 96 engaging stops 54. Inner faces 38 of filter 96 forms one surface of elongated air filter dispersion cavity (EAFDC) 34 enclosures, whereas inner wall 32 forms the opposing surfaces. Air pumps 98 (fans) are attached to inner walls 32, and provide supplemental filtered air 90 by pulling additional air through air filters 96 via module input 94, and delivering the supplemental filtered air 90 to breathing chamber 60 via module output 92. Supplemental filtered air 90 is in addition to the unfiltered air 56 motivated by user 2, which is drawn in from the ambient environment, and pulled through air filter 26, depicted as filtered air 58. Both supplemental filtered air 90 and filtered air 58 enter EAFDC 34 in a substantially uniform manner about the EAFDC 34's length, which prevents preferring one portion of air filter 26 over another, ensuring filtration load leveling, maximizing filter performance and life.

Breathing chamber 60 formed by oronasal cover 46, enclose both nose 18 and mouth 20 of user 2. The distance from mouth 20 and the inner surface of oronasal cover 46 is delineated as mouth to oronasal cover gap 52 (best depicted in FIG. 4). Via experimentation, it has been determined that oronasal cover gap 52 distance is critical in the reduction/elimination of speech distortion. A working range for oronasal cover gap 52 is from about 0.5 inches to about 2.0 inches; whereas a more preferred range is from about 1.0 inches to about 2.5 inches; yet another preferred range is from about 1.5 inches to about 3.0 inches.

The aforementioned apparatus described in inhalation phase 87 remain unchanged during exhalation phase 101. With respect to exhalation phase 101 air movement, user 2 expels exhalation air 100 into breathing chamber 60 where it travels into elongated air filter dispersion cavity (EAFDC) 34, where it uniformly engages inner face 38 (of filter 26), and exhausting filtered air 102 into the ambient environment.

Figure 9:
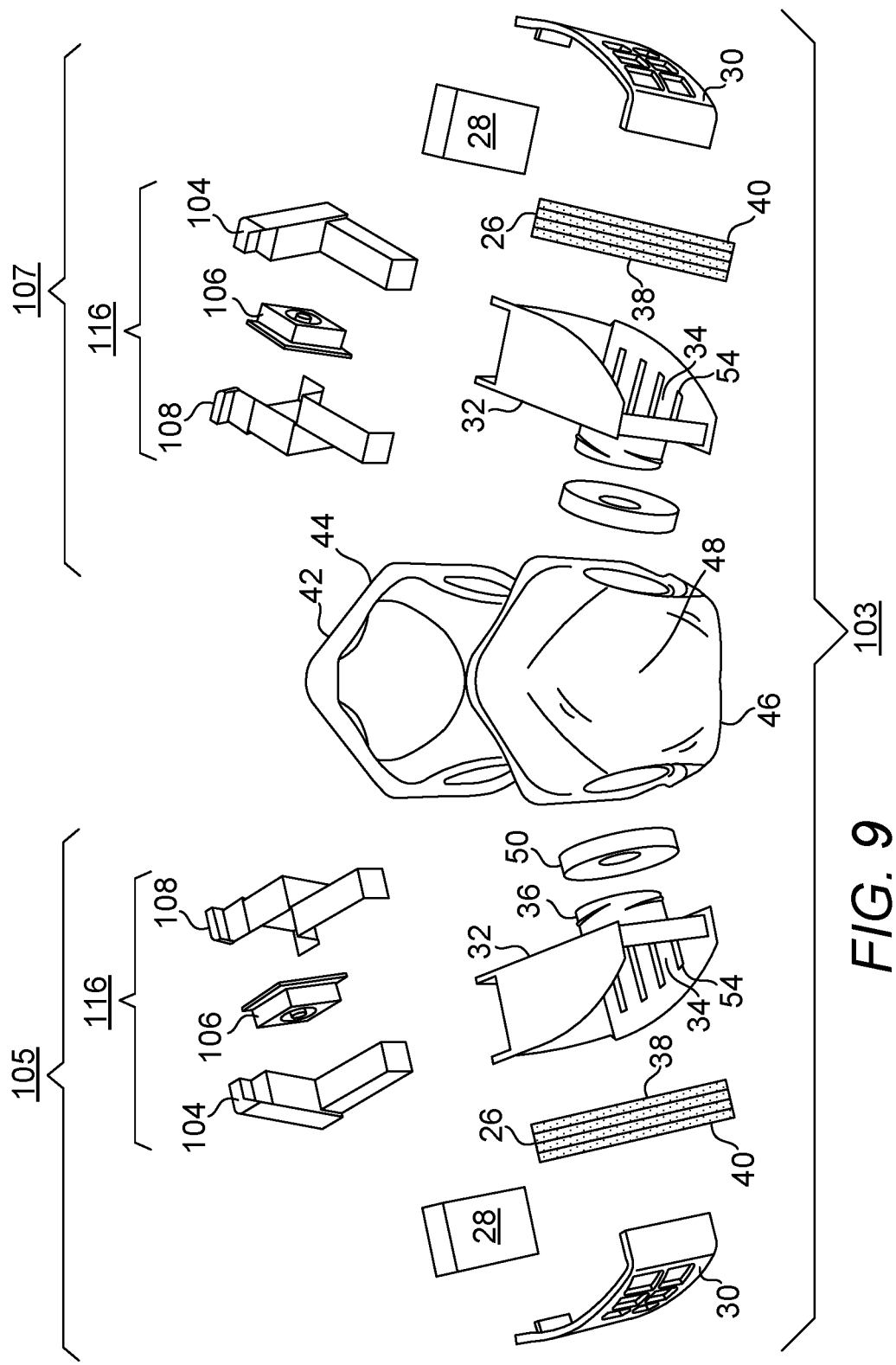
FIG. 9 depicts an exploded perspective view of exemplary components comprising an active, modular respiratory filtration system.

FIG. 9 depicts an exploded perspective view of exemplary components comprising active respiratory filtration system 103. Active respiratory filtration system 103 is comprised of three fluidly interconnected subsystems, right chamber assembly 105, left chamber assembly 107, and centrally located oronasal cover 46, fluidly connecting the three assemblies. It is understood that typical embodiments of the present invention are substantially symmetrical about oronasal cover; therefore, components depicted on right chamber assembly 105 are substantially mirror images of those components associated with left chamber assembly 107. Accordingly, right chamber assembly 105 is comprised of the following main components:

Air filter 26, which can be fabricated from a variety of filtration type materials, such as a pathogenic filtering material, a particulate contaminant filtering material, a HEPA certified material or any combination thereof. Air filter 26 is comprised of two primary, opposing surfaces, inner face 38 and outer face 40.

End-cover 28, which functions as a service door in some embodiments, in other embodiments it serves to convert an active respiratory filtration system to a passive respiratory filtration system by sealing the chamber assemblies 105, 107 openings, sans a forced air module 116 (best depicted in FIG. 10). Some active respiratory filtration system 103 embodiments possess a forced air module which incorporates the door function, so end-cover 28 is not required.

Vented outer wall 30, functions as a support member for chamber assemblies 105, 107; as well as providing the means for air movement to and from the system. Inner wall 32, provides a support surface for air portal 36, as well as providing structure to the elongated air filter dispersion cavity (EAFDC) 34, enclosure. Note that fastener 50 engages distal end portion air portal 36, and functions to fasten oronasal cover 46 to right chamber assembly 105 and left chamber assembly 107.

Elongated air filter dispersion cavity (EAFDC) 34, EAFDC 34 is a gap or void primarily bound by Inner wall 32 and inner face 38 of air filter 26, and serves to load level or balance the air interactions with filter 26, so that one portion of filter 26 does not bear a greater burden than any other portion, thereby extending filter life and filter performance. Filter 26 is held in place by a series of stops 54, such stops 54 can take on a variety of forms, including ribs, posts, and the like.

Forced air module 116 is a removable/replaceable module used in both right chamber assembly 105 and left chamber assembly 107. Forced air module 116 is comprised of an air pump or fan 106, which is supported by outer module fan housing 104 and inner module fan housing 108. Details associated with forced air module 116 can be found on FIG. 10 and corresponding explanations. Forced air module 116 is inserted against inner wall 32 in both right chamber assembly 105 and left chamber assembly 107 as shown in FIG. 11, and maintains the gap or void required to ensure the existence of elongated air filter dispersion cavity (EAFDC) 34.

Oronasal cover 46 provides a substantially sealed breathing chamber 60 for user 2. Depending on needs of the situation, there are a variety of configurations the oronasal cover 46 can possess. For example, transparent materials can be utilized on at least front face 48 when a clear view of the oronasal portion of user 2 is of importance, or a nontransparent filtration material optimized for speech transmission can be used when verbal communications govern the situation at hand. Oronasal cover 46 includes an oronasal circumferential edge 44 that approximately sealingly engages nose-mouth perimeter 16. Enhanced sealing engagement can be attained by the use of conforming seal 42 disposed about oronasal circumferential edge 44.

Figure 11:
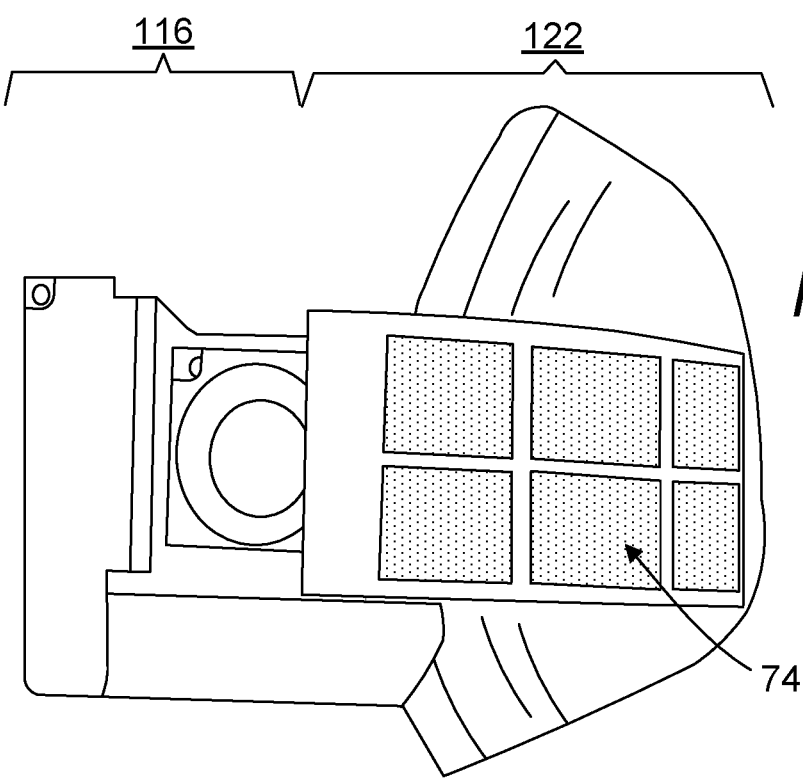
FIG. 11 illustrates a side view of a forced air module partially installed into the receiving portion of the chamber assembly located on both the right and left sides of an active respiratory filtration system.

FIGS. 10 and 11 illustrate a perspective view of forced air module 116. An active, modular respiratory filtration system will have a forced air module 116 configured for the left side of the system and a forced air module configured for the right portion of the filtration system. Shown in FIG. 11, forced air module 116 is shown partially inserted/installed in receiving portion 122 of right chamber assembly 74. A forced air module 116 can be fabricated using a variety of components, depending on the desired functions. An exemplary forced air module 116 is comprised of the following basic components or systems/subsystems:

Fan 106, is supported by outer module fan housing 104 and inner module fan housing 108 as depicted in more detail in FIG. 9. Fan 106 includes module input 94 and module output 92 depicted in FIG. 8 and functions described in corresponding explanations.

Power source 120 (battery) functions to power fans 106, power control board(s) 112, and the like. Power source 120 (battery) can be rechargeable or of the single use variety.

Control system 110 can be fabricated using a variety of components, depending on the desired functions. Depicted is control system 110 comprising on-off switch 114 and control board 112. Other embodiments can include battery charging ports, LED/Lights to provide the user with a variety of indicators for: remaining battery life, charging status, power on/off status, and the like.

Control board(s) 112, this electrical system can be fabricated using a variety of components, depending on the desired functions. Control board(s) 112 embodiments can further include a means for controlling the speed or volume of air movement delivery from power fans 106.

Figure 12:
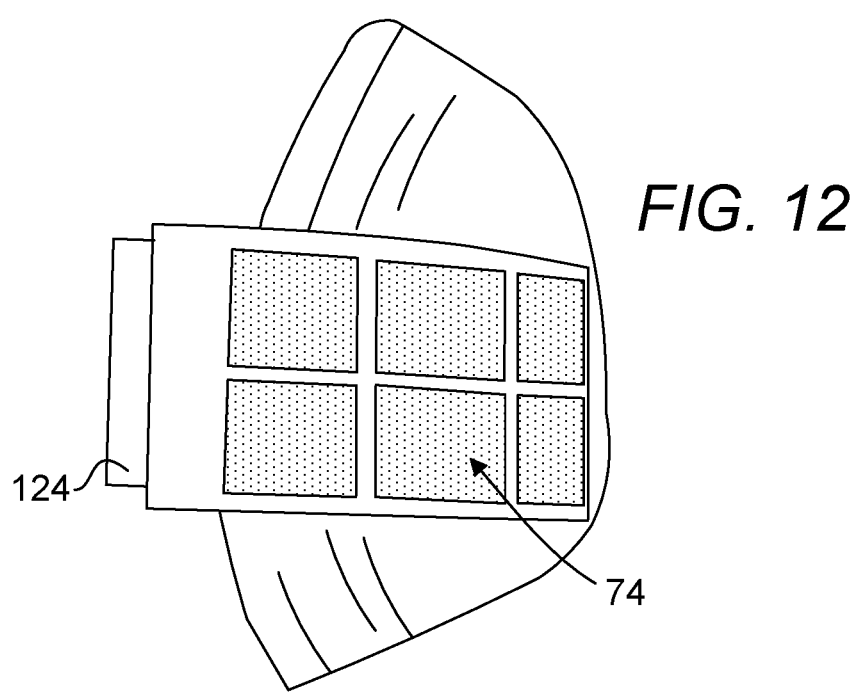
FIG. 12 illustrates a conversion end-cover or plug inserted into the chamber assembly of an active respiratory filtration system. The conversion end-cover member converts an active modular respiratory filtration system to a passive system, by the elimination of the forced air module.

FIG. 12 illustrates a conversion end-cover 124 or plug inserted into the chamber assembly of an exemplary active modular respiratory filtration system, end-cover 124 is configured to sealingly engage the receiving portion of the chamber assembly in order to enable proper filtering. End-cover 124 converts an active modular respiratory filtration system to a passive system, by the elimination of the forced air module.

Figure 13:
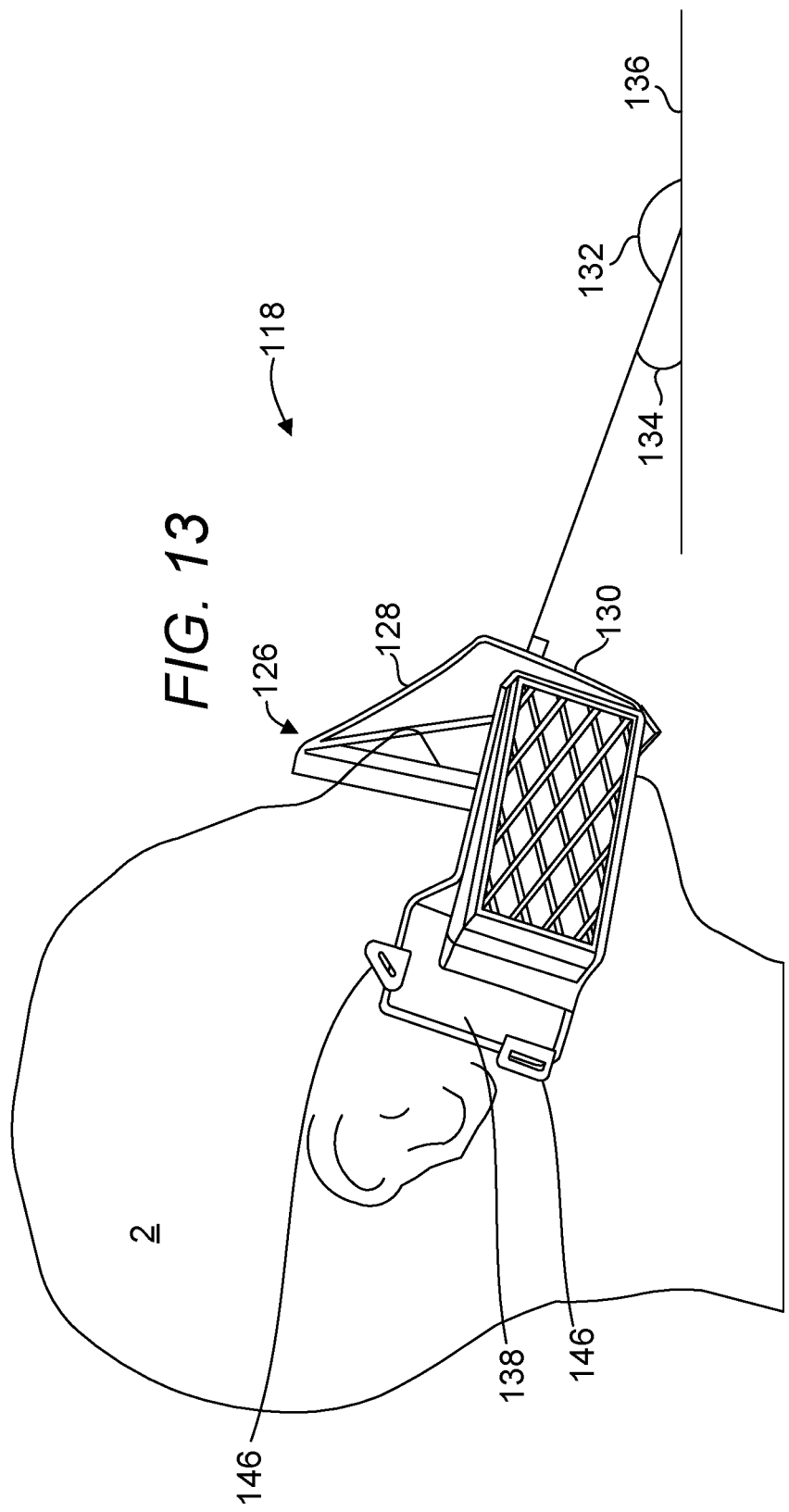
FIG. 13 illustrates a side view of another embodiment of respiratory filtration system having an oronasal cover with front face comprising more than one planar surface.

FIG. 13 illustrates a side view of anti-glare respiratory filtration system 118, which can be either active or passive. Anti-glare respiratory filtration system 118 embodiment includes a multi-planar transparent oronasal cover 126, comprising lower expression window 130 and upper window 128. Lower expression window 130 is configured to allow an observer to at least view mouth 20 of the oronasal area circumscribed by nose-mouth perimeter 16 shown in FIG. 2. It is understood that there are preferential embodiments where the surface area of lower expression window 130 is maximized to further increase the viewing area of the user's 2 oronasal area for enhanced visual type communications.

Light glare issues associated with transparent oronasal cover 126 type covers can interfere with the observer(s) ability to decipher user's 2 oronasal area expressions, and can degrade visual communications. Light glare issues can be minimized/eliminated by configuring planar lower expression window 130 to possess an angle of inclination 132, from about 150 degrees to about 170 degrees taken in a counter clock wise direction from horizon line 136; equivalently, the supplementary angle 134 ranges from about 10 degrees to about 30 degrees taken in a clockwise direction from horizon line 136.

Figure 14:
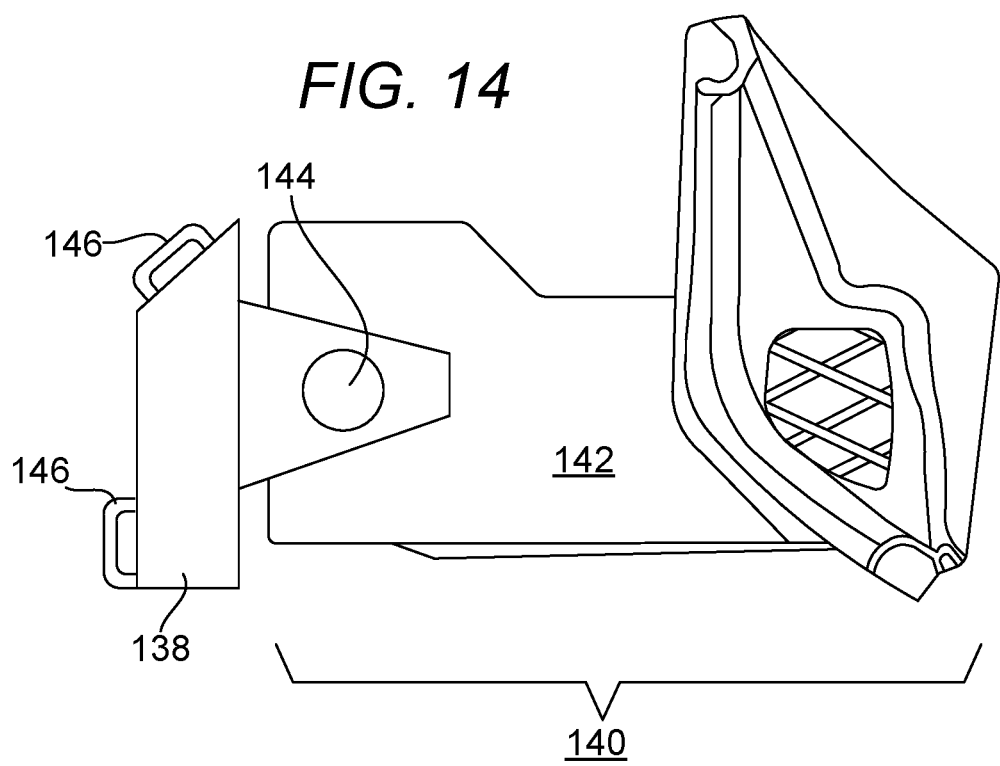
FIG. 14 illustrates a cut-away side view of the respiratory filtration system embodiment shown in FIG. 13. Depicted is a strap plate attached to a harness base plate via a pivot point.

FIG. 14 illustrates a cut-away side view of the respiratory filtration system embodiment shown in FIG. 13. Depicted is rotatable strap plate 138 pivotally attached to support member 142 via pivot point 144. Rotatable strap plate 138 includes support strap receptacles 146 for receiving support strap(s) 6, for engaging user's 2, ears 7, or like support feature(s). Main portion 140 of the harnessing system is substantially supported by the oronasal features of user 2, whereas rotatable strap plate 138 is supported by user's side/rear head features, such as the ears 7, the back of head, or the like. Any vertical motion imparted to main portion 140, such as when user 2 is speaking, is mechanically decoupled from rotatable strap plate 138 via pivot point 144. By decoupling rotatable strap plate 138 from main portion 140, annoying tugs and pulls transmitted to the support strap(s) 6 when user 2 is speaking is substantially reduced/eliminated.

What is claimed herein is:

1. An active respiratory filtration system for providing a hygienic barrier between a user and the user's proximate surroundings, said active respiratory filtration system comprising a harness system adapted to engage with the user's head; said active respiratory filtration system, said active respiratory filtration system comprising:
    an oronasal cover having a right and a left portion, wherein said oronasal cover provides an engagement seal about the perimeter of the user's nose and mouth, thereby delineating the disposition of a breathing chamber; and a right chamber assembly fluidly attached to said right portion of said oronasal cover, and a left chamber assembly fluidly attached to said left portion of said oronasal cover, both said right and left chamber assemblies each comprising an inner wall, a vented outer wall, and an air portal for fluidly communicating with said breathing chamber, wherein said air portal is disposed on said inner wall, and said right and left chamber assemblies configured to engage the user's corresponding right and left cheek areas so to not visually obstruct the nose and mouth areas of the user, said right and left chamber assemblies each further comprising:
        an air filter, said air filter having a filter inner face and a filter outer face, wherein said filter outer face is secured against said vented outer wall such that a void is produced between said filter inner face and said inner wall, wherein said void functions as an elongated air filter dispersion cavity; and
        a forced air module, for delivering a volume of air, having a module air input and a module air output, wherein said module air input engages a portion of said filter inner face, said module air output is fluidly connected to said elongated air filter dispersion cavity, thereby supplying the user with a supply of supplemental filtered air, wherein said oronasal cover is fabricated from a substantially continuous hygienic material; and
    a control system functionally connected to said forced air module for controlling said volume of air, said control system further comprising a power source.

2. The active respiratory filtration system of claim 1, wherein at least the portion of said oronasal cover that covers the user's mouth is positioned at least about 1 inch away from the user's mouth, whereby speech reflective distortions are minimized allowing an observer to receive clear unambiguous acoustic speech communications from the user.

3. The active respiratory filtration system of claim 1, wherein said oronasal cover is substantially fabricated from a continuous transparent material such that an observer has a clear unambiguous optical view of the user's nose and mouth.

4. The active respiratory filtration system of claim 3, wherein said continuous transparent material comprising a substantially planar, lower expression window, having an angle of inclination from about 150 degrees to about 170 degrees, whereby observer glare is substantially diminished.

5. The active respiratory filtration system of claim 1, wherein said oronasal cover is substantially fabricated from a hygienic, non-transparent, porous material configured such that the transmission of sound passes through said material substantially unaltered, thereby allowing an observer to receive clear unambiguous acoustic speech communications from the user; said hygienic, porous, non-transparent material is fabricated from a material selected from the group consisting of a pathogenic filtering material, a particulate contaminant filtering material, a High Efficiency Particulate Air (HEPA) certified material and any combination thereof.

6. The active respiratory filtration system of claim 1, wherein said oronasal cover comprising an oronasal circumferential edge configured to produce a sealing engagement with the perimeter about the user's nose and mouth, said oronasal circumferential edge further comprising a conforming seal disposed about said oronasal circumferential edge so to strengthen said sealing engagement.

7. The active respiratory filtration system of claim 1, wherein each said air filter is replaceable.

8. The active respiratory filtration system of claim 1, wherein each said control system is electrically and mechanically integrated within each said forced air module.

9. The active respiratory filtration system of claim 8, wherein each said forced air module is removeably fastened onto corresponding said right and left chamber assemblies.

10. The active respiratory filtration system of claim 1, wherein said oronasal cover is removeably fastened onto said active respiratory filtration system.

11. The active respiratory filtration system of claim 1, wherein each said air filter is fabricated from a material selected from the group consisting of a pathogenic filtering material, a particulate contaminant filtering material, a HEPA certified material and any combination thereof.

* * * * *